United States Patent

[11] 3,627,815

[72] Inventor Henry K. Hall, Jr.
Tucson, Ariz.
[21] Appl. No. 15,213
[22] Filed Feb. 27, 1970
[45] Patented Dec. 14, 1971
[73] Assignee E. I. du Pont de Nemours and Company
Wilmington, Del.

[54] 1-CYANOBICYCLO 2.1.0 PENTANE, 1-
CYANOBICYCLO 3.1.0 HEXANE, THEIR
HOMOPOLYMERS AND THEIR PREPARATION
3 Claims, No Drawings
[52] U.S. Cl........................................................ 260/464,
260/2
[51] Int. Cl............................................................C07c 121/46

[50] Field of Search............................................. 260/464

[56] References Cited
OTHER REFERENCES
Kinstle, et al., J. A. C. S., 89, 3660– 3661 (1967)
Freeman, et al., J. Org. Chem., 33, 1448– 1453 (1968)

*Primary Examiner*—Joseph P. Brust
*Attorney*—James H. Ryan

ABSTRACT: Described are the two polymerizable strained-ring compounds 1-cyanobicyclo[2.1.0]pentane and 1-cyanobicyclo[3.1.0]hexane and their respective solid homopolymers.

1-CYANOBICYCLO 2.1.0 PENTANE, 1-CYANOBICYCLO 3.1.0 HEXANE, THEIR HOMOPOLYMERS AND THEIR PREPARATION

BACKGROUND OF THE INVENTION

1. Field of the Invention

This invention is concerned with cyano derivatives of bicyclo[2.1.0][3.1.0]and their polymers.

2. Prior Art

Since the discovery of the polymerizability of certain bicyclo[1.1.0]butanes and the observation that this polymerization is promoted by release of strain involving the opening of a single bond between bridgehead carbon atoms, it has been of interest to search for other strained ring bicyclic structures which might similarly polymerize by the opening of a single carbon-to-carbon bond between bridgehead carbons.

Some strained bicyclopentane and -hexane compounds have been reported. For example, T. H. Kinstle, R. L. Welch and R. W. Exley, J. Am. Chem. Soc. 89, 3660–1 (1967) disclose 1-cyano-3,3-dimethylbicyclo[2.1.0]pentane. P. G. Gassman and K. T. Mansfield, J. Org. Chem. 32, 915–20 (1967) disclose bicyclo[2.1.0]pentane-1-carboxylic acid and its methyl and butyl esters. N. A. Nelson and G. A. Mortimer, J. Org. Chem. 22, 1146–53 (1957) disclose bicyclo[3.1.0]-hexane-1-carboxamide and methyl bicyclo[3.1.0]hexane-1-carboxylate.

Known bridgehead substituted bicyclo[2.1.0]pentanes and bicyclo[3.1.0]have not been polymerized.

SUMMARY AND DETAILS OF THE INVENTION

There have now been discovered polymerizable 1-cyanobicyclo[2.1.0]pentane and 1-cyanobicyclo[3.1.0]hexane. These compounds may be represented by the formula,

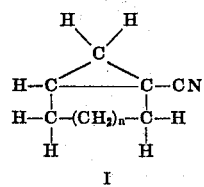

I in which $n$ is 0 (1-cyanobicyclo[2.1.0]pentane) or 1 1-cyanobicyclo[3.1.0]hexane). The polymers of these compounds are characterized by the recurring unit,

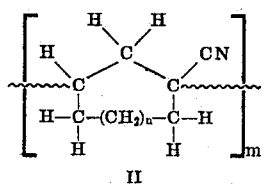

II in which $n$ is defined as above and $m$ is in the range 10–10,000, or even higher, the polymers being solids.

The monomers of formula I are prepared by the reaction of the corresponding monocyclic 3-chloro-1-cyano-cyclopentane and -cyclohexane with a strong base such as sodium hydride or sodium amide. This reaction may be illustrated by the following equation:

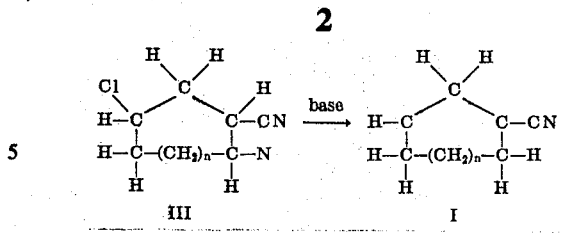

in which $n$ is defined above.

The monomers of formula I are stable compounds which may be purified by distillation. They are not polymerizable by ordinary free radical mechanisms of the type which readily polymerize the common vinyl monomers. Polymerization of the monomers of formula I requires more forcing conditions, such as anionic catalyzed polymerization or the use of extremely high pressures as illustrated in the examples below.

The polymers of formula II vary from thermoplastic moldable compositions, particularly poly(1-cyano-1,3-cyclo-pentane), to high temperature-resistant infusible products, particularly poly(1-cyano-1,3-cyclohexane). All these polymers are solids and all are useful in the form of heat-resistant electrical insulators.

EMBODIMENTS OF THE INVENTION

There follow some examples illustrative of the invention.

EXAMPLE 1

1-cyanobicyclo[2.1.0]pentane

Part A

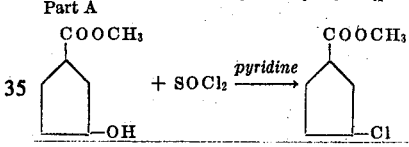

Methyl 3-hydroxycyclopentanecarboxylate (Noyce and Fessenden, J. Org. Chem. 24, 715–717 (1959)), 12.68 g. (0.088 mole) and 7.32 g. (0.0925 mole) of pyridine were dissolved in 16 ml. of chloroform and heated to reflux. With stirring was added during 28 minutes a solution of 12.08 g. (0.10 mole) of thionyl chloride in 16 ml. of chloroform. The reaction mixture was stirred at reflux for an additional hour and was cooled. It was washed first with 2.7 ml. of concentrated hydrochloric acid in 70 ml. of water and finally with saturated potassium chloride solution, dried and distilled. There was some forerun after which 8.14 g. (56.9 percent) of methyl 3-chlorocyclopentanecarboxylate, b.p. 83–89° C. (13 mm.), distilled.

*Analysis.*—Calcd. for $C_7H_{11}O_2Cl$: C, 51.70; H, 6.82. Found: C, 51.96, 51.93; H, 7.31, 6.93.

Part B

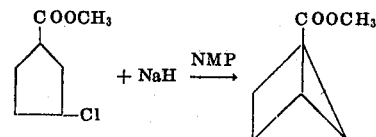

Sodium hydride dispersion, 45 g. (1.0 mole) of a 54 percent dispersion in mineral oil, was cleaned with two 200-ml. portions of pentane. The sodium hydride was covered with 675 ml. of redistilled N-methylpyrrolidone (NMP) and to the mixture was added with stirring a solution of 145.6 g. (0.895 mole) of methyl 3-chlorocyclopentanecarboxylate in 100 ml. of N-methylpyrrolidone. The reaction mixture was maintained at 45° C. with water cooling during the addition, which required 35 minutes. Hydrogen, 20.3 liters, was evolved. The reaction mixture was stirred for an additional 1.5 hours and was cooled to 0° C. To it was added 675 ml. of ether and 675 ml. of saturated ammonium chloride solution. The layers were shaken well and separated. The aqueous layer was extracted four times with 900 ml. of ether. The organic layers were backwashed with 420 ml. of saturated potassium chloride solution, dried, and evaporated. Distillation through a spinning band column gave 81.6 g. (72.2 percent) of methyl bicyclo[2.1.0]pentane-1-carboxylate, b.p. 50° C. (10 mm.). The compound was 98.8 percent pure by gas chromatography, and the n.m.r. spectrum was transparent in the vinyl region.

Part C

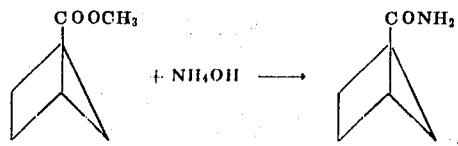

A mixture of methyl bicyclo[2.1.0]pentane-1-carboxylate, 81.6 g. (0.647 mole), with 283 ml. of concentrated ammonium hydroxide was stirred for 7 days at room temperature. It was chilled and filtered to give, after drying, 11.1 g. of white crystals. The filtrate was concentrated on a rotary evaporator to leave a sticky white solid. This was extracted with 800 ml. of boiling ethyl acetate and then with 500 ml. of the same. The first extract, after concentration, gave 9.2 g. of white crystals and the second gave 1.33 g. The combined yield of bicyclo[2.1.0]pentane-1-carboxamide was 30.0 percent. After crystallization from ethyl acetate, it melted at 160°–163° C.

*Analysis.*—Calcd. for $C_6H_9ON$: C, 64.84; H, 8.16; N, 12.60. Found: C, 64.06, 63.93; H, 8.38, 8.29; N, 12.97, 13.07.

Part D

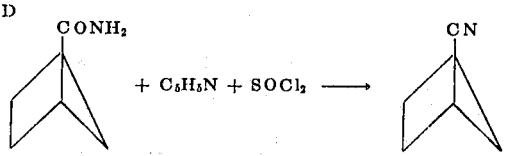

Bicyclo[2.1.0]pentane-1-carboxamide, 9.2 g. (0.083 mole), was dissolved in 57 ml. of purified chloroform. Pyridine, 7.55 g. (0.0955 mole), was added and then at reflux during 17 minutes was added a solution of 10.56 g. (0.0887 mole) of thionyl chloride in 29 ml. of chloroform. Vigorous reaction and blackening occurred. After addition was complete, the mixture was refluxed with stirring for an additional 0.75 hour. It was cooled and washed with 1.4 ml. of 12 N hydrochloric acid in 56 ml. of water, with 2.8 g. of sodium hydroxide in 56 ml. of water, and finally with 5.6 ml. of saturated aqueous potassium chloride in 28 ml. of water. The aqueous phase was backwashed with chloroform each time. The organic layers were dried and concentrated on a rotary evaporator. The semisolid residue was diluted with pentane and filtered. The filtrate was concentrated and distilled twice to give 0.56 g. (7.30) percent of 1-cyanobicyclo [2.1.0]pentane, b.p. 47–53° C. (9 mm.).

| Anal. Calcd. for $C_6H_7N$: | | C, 77.38; | H, 7.58 |
|---|---|---|---|
| | Found: | C, 76.70; | H, 7.56 |
| | | 76.39 | 7.44. |

The compound was 98.1 percent pure by gas chromatography and the n.m.r. spectrum was transparent in the olefinic region.

EXAMPLE 2

1-cyanobicyclo [2.1.0] pentane

Part A

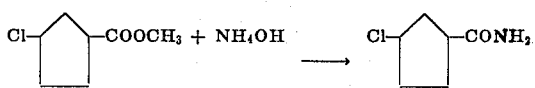

A mixture of 80.0 g. (0.492 mole) of methyl 3-chlorocyclopentanecarboxylate and 500 ml. of 15 M. ammonium hydroxide solution were stirred at room temperature 24 hours. The slurry of crystals was extracted four times with 1-liter portions of chloroform. The organic layers were dried and evaporated to leave 3-chlorocyclopentanecarboxamide in the form of a white solid which was slurried with pentane, of filtered, and dried. It weighed 56.7 g. (78.0 percent) and melted at 149.0–151.6° C.

Part B

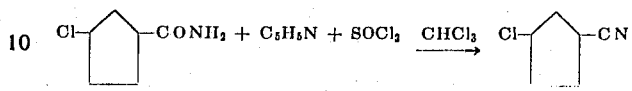

To a refluxing stirred mixture of 27.6 g. (0.187 mole) of 3-chlorocyclopentanecarboxamide and 17.0 g. (0.215 mole) of pyridine in 147 ml. of dried chloroform was added during 16 minutes a solution of 23.8 g. (0.20 mole) of thionyl chloride in 147 ml. of chloroform. The reaction mixture was stirred and refluxed for an additional hour. It was cooled and washed first with 3.1 ml. of 12 N hydrochloric acid in 124 ml. of water, then with 6.2 g. of sodium hydroxide in 124 ml. of water, and finally with 12.4 ml. of saturated potassium chloride in 62 ml. of water. Each aqueous extract was backwashed with 30 ml. of chloroform. The chloroform layers were dried and concentrated. The residue contained some insoluble material. After dilution with ether, it was filtered. The filtrate was distilled to give 13.2 g. (54.4 percent) of 3-chlorocyclopentanecarbonitrile, b.p. 43° C. (0.1 mm.). Gas chromatography indicated that it contained 94.9 percent of one isomer and 5.1 percent of the other.

*Analysis.*—Calcd. for $C_6H_8ClN$: C, 55.60; H, 6.22. Found: C, 55.74; H, 6.25.

Part C

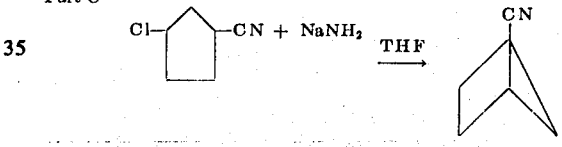

To a stirred solution of 10.93 g. (0.0843 mole) of 3-chlorocyclopentanecarbonitrile in 45 ml. of tetrahydrofuran was added 3.29 g. (0.0843 mole) of sodamide. No reaction appeared to take place during 1 hour at room temperature. The mixture was stirred at 60° C. for 5 hours during which time ammonia evolved slowly. The resulting white slurry was cooled and filtered through diatomaceous earth under nitrogen. It was washed twice with 15-ml. portions of saturated potassium chloride solution, dried, evaporated, and distilled to give 2.92 g. of 1-cyanobicyclo-[2.1.0]pentane, b.p. 51°–52 C. (11 mm.).

| Anal. Calcd. for $C_6H_7N$: | | C, 77.38; | H, 7.58 |
|---|---|---|---|
| | Found: | C, 76.85; | H, 7.36 |
| | | 76.73 | 7.46. |

EXAMPLE 3 POLY(1-CYANOBICYCLO[2.1.0]PENTANE)

Part A

At −80° C.,0.2 ml. of a 1-molar solution of n-butyllithium in hexane was added to a solution of 1 ml. of 1-cyanobicyclo[2.1.0]pentane in 2 ml. of tetrahydrofuran. The solution immediately turned dark green with the formation of the carbanion of the catalyst. Within a few minutes polymer began to separate from the mixture, which became semisolid after an hour. The mixture was then held at 0° C. for several hours to complete polymerization and then brought to room temperature. The reaction mixture was blended twice with methanol, followed by filtering and drying to yield 0.78 g. of polymer in the form of a white powder. The polymer was thermoplastic and could be molded at 200°–220° C. into transparent films of the type suitable for wrapping and packaging. On a hot bar the polymer melted at 240°–254° C. Inherent viscosity (0.5 percent in dimethylformamide at 25° C.) was 0.11. The infrared absorption spectrum was consistent with the structure

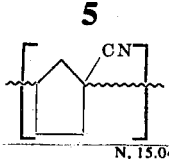

Anal. Calcd. for (C₈H₇N)ₓ: N, 15.04
Found: N, 14.75, 14.59.

Part B

The procedure of Part A was repeated, but with 0.2 ml. of a solution containing 25 g. of diethylmagnesium in 500 ml. of heptane in place of the n-butyllithium catalyst. At −80° C. the mixture turned green but no polymer separated. At 0° C,. polymer formed rapidly and the mixture became semisolid within 1 hour. The polymer was worked up as in part A to yield 0.78 g. of polymer in the form of a white powder. It was thermoplastic and could be molded at 200°–215° C. into transparent films of the type suitable for wrapping and packaging. On a hot bar the polymer melted at 228°–240° C. Inherent viscosity (0.5 percent in dimethylformamide at 25° C.) was 0.53. The infrared absorption spectrum was the same as that for the polymer in Part A.

Anal. Calcd. for (C₈H₇N)ₓ: N, 15.04
Found: N, 14.55, 14.78

Polymerization of the type shown in Parts A and B of example 3 was also carried out with a 2-molar solution of methyllithium in ether as catalyst and the polymer was similar.

EXAMPLE 4

1-cyanobicyclo[3.1.0]hexane

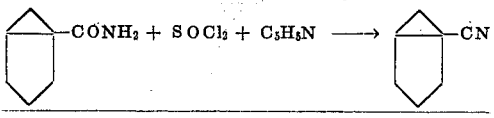

To a suspension of 8.0 g. (0.064 mole) of bicyclo-[3.1.0]hexane-1-carboxamide, Nelson and Mortimer J. Org. Chem. 22, 1146–53 (1957), and 5.41 g. (0.064 mole) of pyridine in 22 ml. of boiling chloroform was added during 18 minutes a solution of 8.1 g. (0.068 mole) of thionyl chloride in 22 ml. of chloroform. The mixture was then stirred and refluxed for 1 hour and cooled. It was washed with 1.1 ml. of concentrated hydrochloric acid in 42 ml. of water, with 2.12 g. of sodium hydroxide in 42 ml. of water, and with 4.2 ml. of saturated potassium chloride solution in 21 ml. of water. Each extract was backwashed with chloroform. The combined organic extracts were dried and evaporated. The residue was diluted with pentane and chilled. Unreacted amide, 0.87 g., was filtered. The filtrate was distilled to give 4.53 g. (66.9 percent) of 1-cyanobicyclo[3.1.0]hexane, b.p. 61°–63° C. (10 mm.). The compound was shown to be 99.3 percent pure by gas chromatography.

Anal. Calcd. for C₇H₉N: C, 78.46; H, 8.47
Found: C, 77.61; H, 8.18
77.53 8.16

EXAMPLE 5

POLY(1-CYANOBICYCLO[3.1.0]HEXANE)

A cylindrical platinum container 7 mm. diameter by 7 mm. high was filled with 1-cyanobicyclo[3.1.0]hexane and sealed. It was then placed in a high pressure tetrahedral anvil apparatus and heated at 300° C. under 65 kb. pressure for 4 hours. It was then cooled and opened. There was obtained a quantitiative yield of hard, brown polymer. It was suitable for machining into gears and slot insulation for miniature electric motors. The polymer was identified by elemental analysis and infrared absorption spectrum. It was insoluble in dimethylformamide and remained hard without softening at 325° C. In differential scanning calorimetry (15° C./min.) the polymer showed a shallow exotherm at 170°–190° C., a sharp exotherm at 413° C. and an endothermic main peak at 437° C. It was infusible up to its decomposition temperature.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

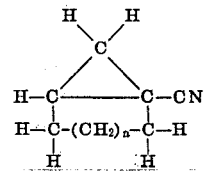

where $n$ is 0 or 1.

2. 1-Cyanobicyclo[2.1.0]pentane, the compound of claim 1 wherein $n=0$.

3. 1-Cyanobicyclo[3.1.0]hexane, the compound of claim 1 wherein $n=1$.

* * * * *